United States Patent
Kermani et al.

[11] Patent Number: 6,118,788
[45] Date of Patent: Sep. 12, 2000

[54] BALANCED MEDIA ACCESS METHODS FOR WIRELESS NETWORKS

[75] Inventors: Parviz Kermani, South Salem; Babak Rezvani, Port Chester; Mahmoud Naghshineh, Fishkell; Claus Michael Olsen, Cortlandt Manor, all of N.Y.; Timucin Ozugur, Atlanta, Ga.

[73] Assignee: International Business Machines Corporation, Armonk, N.Y.

[21] Appl. No.: 08/950,748

[22] Filed: Oct. 15, 1997

[51] Int. Cl.$^7$ .................................................. H04L 12/43
[52] U.S. Cl. ............................................................ 370/461
[58] Field of Search ................................. 370/310, 431, 370/437, 445, 447, 448, 461, 463, 438, 439; 340/825.51

[56] References Cited

U.S. PATENT DOCUMENTS

| | | | |
|---|---|---|---|
| 5,729,542 | 3/1998 | Dupont | 370/346 |
| 5,844,900 | 12/1998 | Hong et al. | 370/342 |
| 5,953,338 | 9/1999 | Ma et al. | 370/395 |
| 5,953,339 | 9/1999 | Baldwin et al. | 370/397 |

OTHER PUBLICATIONS

Vaduvur et al. "MACAW: A Media Access Protocol for Wireless LAN's"; Sigcomm 94–08/94 London, England UK.

*Primary Examiner*—Huy D. Vu
*Assistant Examiner*—Alexander Boakye
*Attorney, Agent, or Firm*—Whitham, Curtis & Whitham; Douglas W. Cameron, Esq.

[57] ABSTRACT

Fairness algorithms and access methods enable non-zero channel access for wireless communication systems operating in a random access channel environment. Fair access to a random access channel for each station in a wireless network is assured by each station calculating a priority or probability for accessing the channel based on logical connections among certain stations, based on other stations perception of the channel and based on each calculating station's own perception of the channel properties.

19 Claims, 1 Drawing Sheet

BALANCED MEDIA ACCESS METHODS FOR WIRELESS NETWORKS

CROSS-REFERENCE TO RELATED APPLICATION

This application discloses subject matter related to application Ser. No. 08/664,718 filed Jun. 17, 1996, by Fritz R. Gfeller, Peter D. Hortensius, Patrick K. Kam, Parviz Kermani, Danny N. McKay, Mahmoud Naghshineh, Claus M. Olsen and Babak Rezvani for "Media Access Control Protocols in a Wireless Communication Network Supporting Multiple Transmission Rates" and assigned to a common assignee herewith. The disclosure of application Ser. No. 08/664,718 is incorporated herein by reference.

DESCRIPTION

BACKGROUND OF THE INVENTION

1. Field of the Invention

The present invention generally relates to access methods for wireless networks and, more particularly, to protocols used in accessing the shared wireless media.

2. Description of the Prior Art

A wireless network is a way of associating, or grouping, portable devices which communicate with each other via radio frequency (RF) signals or infrared (IR) light signals. Wireless networks are more flexible and cheaper to install than wired networks, and the emergence of portable terminals in work, living ant traveling environments is accelerating the embracing of wireless networks.

In general, a specific medium access control (MAC) protocol is implemented in order to access and share a medium in an organized and efficient fashion. In essence, the MAC protocol ensures that only one station at a time is permitted to access a certain channel on the medium. However, in wireless networks, each station has a unique view of the medium; i.e., the channel properties viewed from station A can not be expected to be identical to the channel properties as viewed from another station B. This is in stark contrast to wired networks, where all stations have about the same view of the channel conditions. The reason for the unique channel view in wireless networks is caused by the fact that the medium is not confined within any well defined physical boundaries. Thus, there is no control over signal levels, noise levels and interference levels. One of the side effects of this is a phenomenon known as the "hidden node" or "hidden terminal" problem.

FIG. 1 illustrates the problem. In order to explain FIG. 1, we need to introduce the term "communications range". Communications range is the maximum distance between two stations where the two stations can communicate without errors. This distance is dependent on a number of factors, such as the launched signal level at the transmitter station, the noise level at the receiver station, the strength of interfering signals at the receiver, and the physical orientation of the transmitter and receiver units, FIG. 1 further assumes that all six stations share the same channel. This means that only one station at a time is allowed to access the channel. The other stations become observers; i.e., they are in deferred mode.

FIG. 1 shows six stations A, B, C, D, E, and F. The solid lines show which station pairs are within communications range of each other. (In addition, the fat lines indicate which stations have set up logical connections with each other, which we shall use later on.) For example, stations C and D can communicate and stations D and E can communicate. But stations E and C can not communicate and stations E and B can not communicate.

Whether two stations can communicate or not depends on the particular value of the "communications range" which, in general, will be different for each station pair. In FIG. 1, stations A and E are said to be "hidden" from each other with respect to station D with which they can both communicate. Similarly, stations B and D are hidden from each other with respect to station C (as well as station A) with which they can both communicate.

Hidden nodes are common in IR Systems, especially if the IR system is a so called directed system where the transmitters launch power within certain angles and where there has to be line-of-sight between two communicating stations.

It has been found, both experimentally and theoretically, that if stations A and B are communicating with each other, and stations C and D are communicating with each other, and stations E and F are communicating with each other, then the middle station pair (C,D) has zero throughput when all stations constantly has data queued up for transmission. The reason for this is the unbalanaced view of the channel as seen from each station. The (C,D) station pair observes traffic from both station pair (A,B) and from station pair (E,F), but station pair (A,B) only sees traffic from station pair (C,D) and so does station pair (E,F). Due to the dynamics of the system, only station pairs (A,B) and (E,F) will he able to access the channel because station pair (C,D) end up being observers most of the time. This problem is classified as a "fairness" problem, and hidden nodes is the main cause for this fairness problem.

The six station example presented here is a very serious fairness problem as literally the middle station pair may never access the medium; i.e., they will have zero throughput. Solutions for this kind of fairness problem has not yet been addressed in the prior art. A fairness problem of a much less serious nature has been addressed by Vaduvur Bharghavan, Alan Demers, Scott Shenker and Lixia Zhang in "MACAW: A Media Access Protocol for Wireless LANs", ACM-SIGCOMM '94, pp. 212–224, from the perspective of obtaining per-stream fairness in a client-server configuration, in which separate queues for each logical connection are implemented and each queue has its own back-off algorithm. Bharghavan et al. also proposed a back off window size exchange method which attempted to synchronize all stations to use the same window size for the calculation of their back off values. In general, Bharghavan et al. focused on improving the channel throughput; i.e., the sum of all stations' throughput. Bharghavan et al. did not address the issue of preventing zero access to the network at any station and for any topology.

SUMMARY OF THE INVENTION

It is therefore an object of the present invention to provide fairness algorithms and access methods for wireless communication systems operating in a random access channel environment.

It is another object to enable non-zero channel access for each station in a wireless network.

According to the invention, there is provided fair access to a random access channel for each station in a wireless network. More precisely, each station calculates a priority or probability for accessing the channel based on logical connections among certain stations, based on other stations perception of the channel and based on each calculating station's own perception of the channel properties.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
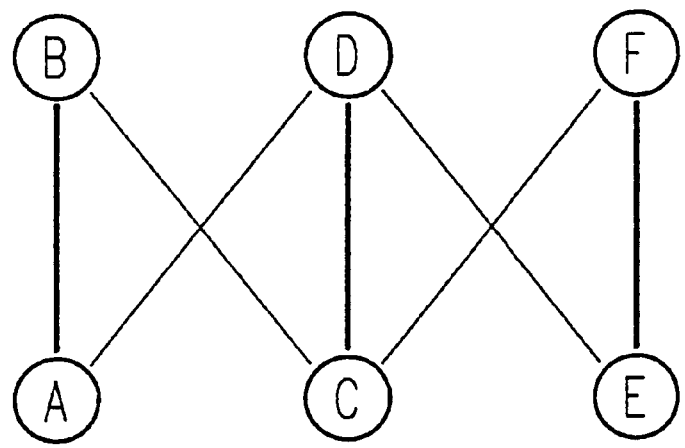
FIG. 1 is a topological diagram showing an example of a six station infrared wireless network with a single shared channel.

The preferred embodiment of the invention is based on the medium access control (MAC) protocol as described in application Ser. No. 08/664,718. The MAC protocol of that application uses an initial RTS/CTS control frame exchange to establish a reservation among two stations A and B.

Say station A has DATA to send to station B, then station A will first launch a request-to-send (RTS) frame. Station B in turn replies with a clear-to-send (CTS) frame to station A, and now station A can start sending the DATA frames to station B. Station A terminates the reservation by launching an end-of-burst (EOB) control frame to station B, and station B replies with an end-of-burst-confirm (EOBC) control frame to station A.

The stations A and B are called reservation participants. Other stations overhearing the frame exchange between stations A and B are called reservation non-participants (NP), or observers, or are said to be in deferred mode. NP stations will remain quiet until the reservation between stations A and B has been terminated. In the example shown in FIG. 1, the middle station pair (C,D) will spend all their time as non-participants because they keep detecting reservations made by station pair (A,B) and by station pair (E,F).

A DATA frame is composed of a header and a frame body. Control frames do not have a frame body, with the exception of the RTS frame, described below. The header always contains the frame type (FT) and the reservation identification (RID) in order that any station detecting this frame will know exactly which type of frame it is and which reservation it belongs to. Further, the DATA header contains the block length (BL) of the frame body. The frame body of DATA frames and the RTS frame further contains the destination address (DA) of the station the frame is directed to, the source address (SA) of the station sending the frame, the data information field (DATA frames only), and the CRC check sum of the frame body.

The protocol disclosed in application Ser. No. 08/664,718 was designed for a directed infrared communications channel. This means that there will be stations that can only detect frames flowing from station A to station B or from station B to station A. For example, in FIG. 1 station C can only detect frames flowing from station B to station A. One may say that both stations C and A are "staring" at station B and therefor can not "see" each other.

The RTS/CTS frame exchange is meant to prevent collisions at station B by hidden nodes such as stations A and C. Thus, if station C does not detect the initial RTS frame from station A, it will detect the CTS reply from station B.

There art two parts to the preferred embodiment of the present invention:

a) An algorithm, or method, for calculating the channel access priority or probability. This method is denoted as the "Connection-Based Fairness" (CBF) Algorithm.

b) A method for exchanging window size information among the stations which is intended to work in conjunction with the first part. This method is denoted as the "Window-Exchange" (WE) method.

Since both methods are intimately associated with the back-off, or contention, process, we shall first briefly explain the back-off process in random access networks and assuming the MAC protocol as described above. In random access networks, a station contends for the channel, i.e., it backs off, by throwing a random number between 0 and the back-off window size (WS). Upon expiration of the back-off timer, the station launches the RTS frame. If the station receives a CTS frame in return, it considers the channel access attempt a success and in turn it decreases the WS; otherwise, WS is increased.

Connection-Based Fairness (CBF) Algorithm

In this method for improving the channel access fairness, each station $A_i$ calculates a channel access priority or probability, $p_{ij}$, for each logical connection it may have with other stations $B_j$. The calculation is based solely on station $A_i$'s knowledge about all possible logical connections that may affect station $A_i$'s chance of accessing the medium. Before explaining the details of the algorithm, we shall first account for how the access priority is used in a real system. The channel access priority, $p_{ij}$, is the probability that a station $A_i$ shall access the medium by launching an RTS frame destined for station $B_j$. The mechanism is as follows. Assume that station $A_i$ has data to send to station $B_j$. Station $A_i$ first throws a random back off (BO) value between 1 and the window size (WS). Next, it backs off according to the BO value. When its back off timer expires, station $A_i$ will in turn throw a random number, r, between 0 and 1, and if $r \leq p_{ij}$, it will launch the RTS frame, but if $r > p_{ij}$, the station will throw a new random BO value between 0 and WS and back off again. Optionally, in the latter case, the WS may be increased. This method of accessing the medium is commonly known as a p-persistent random access process.

Figure 2:
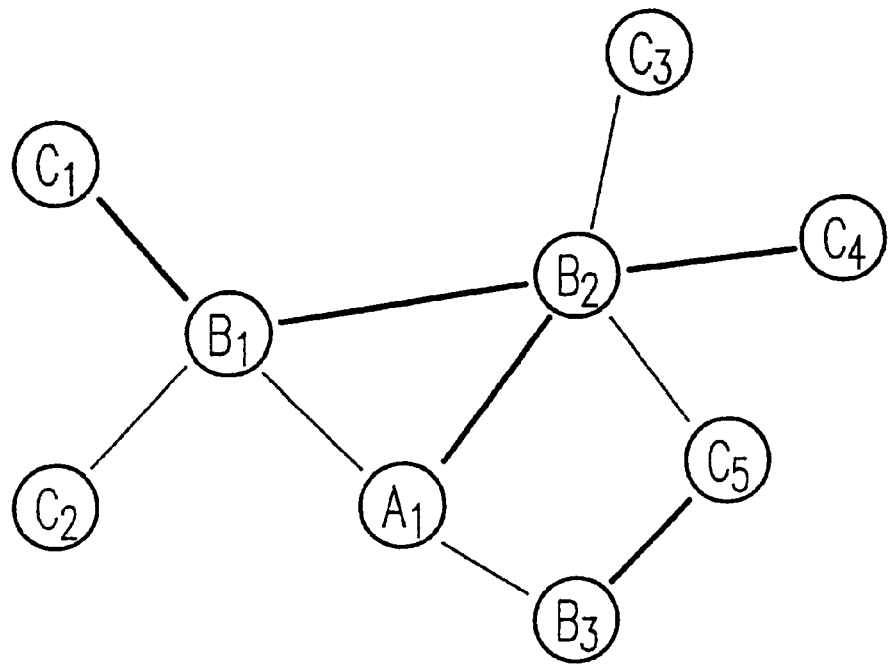
FIG. 2 is a topological diagram showing a typical infrared wireless network.

Referring again to the drawings, and more particularly to FIG. 2, there is shown a typical wireless network for the purpose of explaining the CBF algorithm. In FIG. 2, the solid lines show which stations are within communications range of each other, and the fat solid lines show which stations have logical connections with each other. (Note, that the number of solid lines is the maximum number of possible logical connections in the network.) The figure is meant to illustrate that a station A may have logical connections with B stations but not with C stations, and that B stations may have logical connections with station A, other B stations and with C stations. Thus, station A is a blind node to the C stations, and vice versa, with respect to the B stations.

The connection topology can be formally described as follows. A source transmitter station $A_i$ has a maximum number of possible connections, $M_i$, with stations $B_j$ of which $N_i \leq M_i$ are actual logical connections. In the same fashion, each station $B_j$ has a maximum number of possible connections, $M_j$, with station $A_i$, other B stations and with $C_k$ stations of which $N_j \leq M_j$ are actual logical connections. At some point, the stations will broadcast how many possible connections M and how many logical connections N they have. This means that station $A_i$ will have full knowledge about she number of possible connections, $M_j$, and logical connections, $N_j$, at each station $B_j$. (Likewise, all $B_j$ stations will have full knowledge about the number of connections at station $A_i$ and at stations $C_k$, and all $C_k$ stations will have full knowledge about the number of connections at stations $B_j$.)

Note that the number of possible connections at $A_i$ will always be smaller or equal to the sum of the number of possible connections at each of the stations $B_j$; i.e., $M_i \leq \Sigma M_j$. As an example, in FIG. 2 station $B_1$ would broadcast that it has four possible connections and two logical connections, and the stations $A_1$, $B_2$, $C_1$ and $C_2$ which are within communications range of $B_1$ will be informed about this. Similarly, Station $A_1$ would broadcast that it has three possible connections and one logical connection, and the stations $B_1$, $B_2$ and $B_3$ which are within communications range of $A_1$ will be informed about this.

The calculation of the channel access priority or probability, $p_{ij}$, is summarized in Table 1 and is explained in the following description.

TABLE 1

Summary of Connection-Based Fairness Algorithm

| Condition | Channel Access Priority |
|---|---|
| $N_i = \sum_{j \in M_i} N_j$ | $p_{ij} = 1,\ j \in M_i$ |
| $N_i < \sum_{j \in M_i} N_j$ | $p_{ij} = \begin{cases} \dfrac{M_j}{\max\{M_j\}} & \text{if } M_j \neq \max\{M_j\} \\ \min\left\{\dfrac{M_i}{\max\{M_j\}}, 1\right\} & \text{if } M_j = \max\{M_j\} \end{cases} j \in M_i$ |

| Parameter | Explanation |
|---|---|
| $M_i$ | number of ($B_j$) stations within communications range of station $A_i$ |
| $M_j$ | number of stations within communications range of station $B_j$ |
| $N_i$ | number of logical connections at station $A_i$ |
| $N_j$ | number of logical connections at station $B_j$ |
| $p_{ij}$ | channel access priority from station $A_i$ to station $B_j$ |

If $N_i = \Sigma N_j$, then station $A_i$ chooses $p_{ij} = 1$ for each logical connection it has. In other words, if stations only have logical connections with station $A_i$, $p_{ij} = 1$ for each logical connection. This scenario would occur if station $A_i$ is a center station, such as an access point or server, to which all the $B_j$ stations are connected. In this case, there may be $C_k$ stations in the network but none of the $B_j$ stations have established logical connections with any of the $C_k$ stations.

If $N_i < \Sigma N_j$, then the $B_j$ stations have logical connections other than those with station $A_i$; i.e., they either have logical connections with $C_k$ stations or within the $B_j$ stations themselves (e.g., the $B_1$–$B_2$ connection in FIG. 2). The maximum number of possible connections at anyone of the $B_j$ stations; i.e., max $\{M_j\}$ is determined. There are two cases to handle here:

If $N_i = \Sigma N_j$ and $M_j \neq \max\{M_j\}$, namely if the destination station is not the station that has the maximum number of possible connections, the access priority, $p_{ij}$, from source station $A_i$ to $$p_{ij} = \frac{M_j}{\max\{M_j\}}.$$

If $N_i = \Sigma N_j$ and $M_j = \max\{M_j\}$, namely if the destination station $B_j$ is the station that has the maximum number of possible connections, the access priority, $P_{ij}$, from source station $A_i$ to $$p_{ij} = \min\left\{\frac{M_i}{\max\{M_j\}}, 1\right\}.$$

Window-Exchange (WE) Method

The second method for improving the access fairness is based on each station broadcasting the window size (WS) associated with the BO value used for transmission of the RTS frame. Referring to FIG. 2 and assuming that station $A_1$ has data to send to say station $B_2$, station $A_1$ would insert the WS in the header part of the RTS frame. In turn, the destination station $B_2$ copies the WS into the CTS reply frame. All stations detecting either the RTS or CTS frame will extract the WS and will change their own WS to the received WS if and only if the received WS is smaller than there own WS. Otherwise, they keep their own WS. The copying of the WS from the RTS into the CTS frame enables hidden nodes, $C_{3,4,5}$ to be informed about the WS from station $A_1$. Note that station $A_1$ ignores the WS value in the return CTS frame. Instead, it decreases the WS if the channel access attempt was successful (which it is if it receives the CTS reply).

It has been found that when the CBF and WE methods are implemented individually that the fairness problem of FIG. 1 is indeed relieved to some extent. However, if the two solutions work in conjunction with each other, much better results are obtained.

Essentially, the WE method helps stations to decrease their WS. This is especially helpful for a "sandwiched" station pair such as station pair(C,D) in FIG. 1 which would otherwise tend to back off with the largest possible WS. The CBF method helps to reduce the access priority of edge station pairs such as station pair (A,B) in FIG. 1 while maximizing the access priority of the sandwiched station pair (C,D).

There are other ways that the stations may access the channel on a fair basis. The method described above could be based on other network properties than just the connections. For example, station $A_i$'s access priority could be dependent on the average channel access time, $T_{ij}$ and $T_{ji}$, from station $A_i$ to station $B_j$ and from station $B_j$ to station $A_i$ and on the traffic load, $L_{ij}$ and $L_{ji}$, from station $A_i$ to station $B_j$ and from station $B_j$ to station $A_i$. Thus, stations $B_j$ would communicate to station $A_i$ their average channel access time and their traffic load which would tell station $A_i$ how effectively other stations are utilizing the channel and to what extent they have a need for using the channel, respectively, such that station $A_i$ can adjust its access priority according to the following equation:

$$p_{ij} = \frac{T_{ij}^\gamma}{\dfrac{1}{\sum_{k \in M_i}(L_{ki} + L_{ik})} \cdot \sum_{k \in M_i}(T_{ki}^\gamma \cdot L_{ki} + T_{ik}^\gamma \cdot L_{ik})},$$

where $\gamma$ is a fudge parameter which makes it possible to adjust the impact of the average channel access time on $p_{ij}$. This method of calculating the access priority is based on the assumption that the stations periodically exchange information about the average channel access time and their load. This will enable stations to have much more accurate and much more up-to-date information about other stations than the CBF method described above.

Having described alternate ways that a station may calculate its access priority, it follows that a station $A_i$ might instead be informed what its access priority should be by enabling another station $B_j$ to calculate station $A_i$'s access priority and then communicate this priority to station $A_i$. A further alternative is for station $A_i$ to self-discover channel properties and station-to-station relationships by simply "sniffing" the channel. Then, in conjunction with the station's own performance, it may calculate a certain access priority.

Based on the foregoing descriptions of specific ways a shared channel may be accessed more fairly by the utilization of an access priority, other methods, both simpler and more complex, with which the channel may be accessed in a fair manner will readily suggest themselves to those skilled in the art. One possibility is that the entire protocol involved in the channel access might be dynamically adjusted according to information that is received from the network about the other stations' channel properties and according to a station's own channel performance.

While the invention has been described in terms of a preferred embodiment with alternatives, those skilled in the art will recognize that the invention can be practiced with modification within the spirit and scope of the appended claims.

Having thus described our invention, what we claim as new and desire to secure by Letters Patent is as follows:

1. In a communication network having a plurality of stations communicating with each other, a method guaranteeing non-zero access to a random access channel to each of said stations in the network comprising the step of calculating at each station in the network a channel access priority based on connections among stations in the network, wherein calculating a channel access priority is based on a number of possible connections among the stations in the network.

2. In a communication network having a plurality of stations communicating with each other, a method guaranteeing non-zero access to a random access channel to each of said stations in the network comprising the step of calculating at each station in the network a channel access priority based on connections among stations in the network, wherein calculating a channel access priority is based on a number of possible and logical connections among the stations in the network.

3. In a communication network having a plurality of stations communicating with each other, a method guaranteeing non-zero access to a random access channel to each of said stations in the network comprising the step of calculating at each station in the network a channel access priority based on connections among stations in the network, wherein calculating a channel access priority is based on a connectivity pattern among the stations in the network.

4. In a communication network having a plurality of stations communicating with each other, a method guaranteeing non-zero access to a random access channel to each of said stations in the network comprising the step of calculating at each station in the network a channel access priority based on connections among stations in the network, wherein calculating a channel access priority is performed by a first station in the network for a second station in the network and the calculated access priority is communicated from the first station to the second station.

5. In a communication network having a plurality of stations communicating with each other, a method guaranteeing non-zero access to a random access channel to each of said stations in the network comprising the steps of:

calculating at each station in the network a channel access priority based on connections among stations in the network; and generating a back-off value at each of the stations in the network, a back-off window size (WS) determining a time for launching a frame, the back-off value for any station being recalculated to produce a new value of the WS if the station fails to access the channel based on the calculated access priority.

6. The method recited in claim 5 further comprising the step of exchanging window size (WS) information among the stations of the network.

7. The method recited in claim 6 wherein stations $A_i$ are in communication with stations $B_j$ and stations $B_j$ are in communication with stations $C_k$ and the step of calculating is based on all stations $B_j$ within communication reach of stations $A_i$ and based on all stations $C_k$ within communication reach of said stations $B_j$.

8. The method recited in claim 7 wherein in the step of exchanging WS information, stations $A_i$ communicate WS information to stations $B_j$ and stations $B_j$ communicate WS information to stations $C_k$.

9. The method recited in claim 8 wherein each of stations $B_j$ and $C_k$ select a minimum value of calculated value of WS within each of said stations and communicated window sizes to said stations from stations $A_i$.

10. In a communication network having a plurality of stations communicating with each other, a method guaranteeing non-zero access to a random access channel to each of said stations in the network comprising the step of calculating a channel access priority based on information in transmission parameters and channel access parameters among stations in the network including an exchange of information among the stations in the network regarding their access priority, average channel access time, data throughput, traffic load, data encoding, packet type, and packet transfer success rate.

11. In a communication network having a plurality of stations communicating with each other, a method guaranteeing non-zero access to a random access channel to each of said stations in the network comprising the step of calculating a channel access priority is based on information on transmission parameters and channel access parameters in the network including a station's own average channel access time, data throughput, traffic load, data encoding, packet type, packet transfer success rate, detected connections among other stations, and detected traffic properties between other stations.

12. In a communication network having a plurality of stations communicating with each other, a method guaranteeing non-zero access to a random access channel to each of said stations in the network comprising the steps of:

calculating a channel access priority based on information on transmission parameters and channel access parameters among stations in the network; and generating a back-off value at each of the stations in the network, a back-off window size (WS) determining a time for launching a frame, the back-off value for any station being recalculated to produce a new value of the WS if the station fails to access the channel based on the calculated access priority.

13. The method recited in claim 12 further comprising the step of exchanging window size (WS) information among the stations of the network.

14. The method recited in claim 13 wherein stations $A_i$ are in communication with stations $B_j$ and stations $B_j$ are in communication with stations $C_k$ and the step of calculating is based on all stations $B_j$ within communication reach of stations $A_i$ and based on all stations $C_k$ within communication reach of said stations $B_j$.

15. The method recited in claim 14 wherein in the step of exchanging WS information, stations $A_i$ communicate WS information to stations $B_j$ and stations $B_j$ communicate WS information to stations $C_k$.

16. The method recited in claim 15 wherein each of stations $B_j$ and $C_k$ select a minimum value of calculated value of WS within each of said stations and communicated window sizes to said stations from stations $A_i$.

17. A communication network comprising:

a plurality of stations communicating with each other over a random access channel;

each of said stations including calculating means for calculating at each station in the network a channel access priority based on information on transmission parameters and channel access parameters among stations in the network; and means at each station in the network for generating a back-off value, a back-off window size (WS) determining a time for launching a frame, the back-off value for any station being recalculated to produce a new value of the WS if the station fails to access the channel based on the calculated access priority.

18. The communication network recited in claim 17 wherein each station in the network includes means exchanging window size (WS) information among the stations of the network.

19. The communication network recited in claim 17 wherein the network is a wireless network.

* * * * *